(12) United States Patent
Lee

(10) Patent No.: US 11,873,900 B2
(45) Date of Patent: Jan. 16, 2024

(54) GASKET

(71) Applicant: Jong Chul Lee, Ulsan (KR)

(72) Inventor: Jong Chul Lee, Ulsan (KR)

( * ) Notice: Subject to any disclaimer, the term of this patent is extended or adjusted under 35 U.S.C. 154(b) by 0 days.

(21) Appl. No.: 16/331,693

(22) PCT Filed: Sep. 7, 2017

(86) PCT No.: PCT/KR2017/009810
§ 371 (c)(1),
(2) Date: Mar. 8, 2019

(87) PCT Pub. No.: WO2018/048215
PCT Pub. Date: Mar. 15, 2018

(65) Prior Publication Data
US 2019/0234516 A1 Aug. 1, 2019

(30) Foreign Application Priority Data

Sep. 9, 2016 (KR) .......... 10-2016-0116278
Dec. 2, 2016 (KR) .......... 10-2016-0163449

(51) Int. Cl.
| | | |
|---|---|---|
| *F16J 15/08* | (2006.01) | |
| *F16L 17/06* | (2006.01) | |
| *F16J 15/06* | (2006.01) | |
| *F16L 23/16* | (2006.01) | |
| *F16L 23/18* | (2006.01) | |

(52) U.S. Cl.
CPC ............... *F16J 15/08* (2013.01); *F16J 15/06* (2013.01); *F16L 17/06* (2013.01); *F16L 23/16* (2013.01); *F16L 23/18* (2013.01)

(58) Field of Classification Search
CPC .......... F16J 15/08; F16J 15/06; F16J 15/0818; F16J 15/0887; F16J 2015/0837; F16J 15/123; F16J 15/022; F16L 17/06; F16L 23/16; F16L 23/18
See application file for complete search history.

(56) References Cited

U.S. PATENT DOCUMENTS 1,793,423 A * 2/1931 Fitzgerald .............. F16J 15/123
277/601
1,846,402 A * 2/1932 Oven .................... F16J 15/123
277/601
(Continued)

FOREIGN PATENT DOCUMENTS

CN 103016867 A 4/2013
CN 103671918 A 3/2014
(Continued)

*Primary Examiner* — Eugene G Byrd
(74) *Attorney, Agent, or Firm* — NKL LAW; Jae Youn Kim

(57) ABSTRACT

Provided is a gasket, and more particularly, to a gasket including a C-ring end formed at at least one side of a kammprofile. According to the present invention, a higher bolting force and restoring force may be secured than those of other gaskets having the same size as the gasket. Furthermore, a core spring may be easily fixed and attached to the gasket through the C-ring end formed at the kammprofile without an external jacket. Accordingly, production costs may be decreased by simplifying the structure of the gasket as described above.

7 Claims, 14 Drawing Sheets

(56) References Cited

U.S. PATENT DOCUMENTS

| | | | | |
|---|---|---|---|---|
| 2,157,102 A * | 5/1939 | Victor | ............... | F16J 15/123 277/601 |
| 3,302,953 A * | 2/1967 | Glasgow | ............... | F16J 15/127 277/611 |
| 3,909,019 A * | 9/1975 | Leko | ............... | F16J 15/122 277/649 |
| 4,114,907 A * | 9/1978 | Abbes | ............... | F16J 15/0893 277/647 |
| 4,188,037 A * | 2/1980 | Abbes | ............... | F16J 15/002 277/330 |
| 4,662,643 A * | 5/1987 | Rosenquist | ............... | F16J 15/123 277/597 |
| 4,998,741 A * | 3/1991 | Udagawa | ............... | F16J 15/0825 277/595 |
| 5,165,372 A * | 11/1992 | Miyaoh | ............... | F16J 15/0825 123/193.3 |
| 5,201,534 A * | 4/1993 | Miyaoh | ............... | F16J 15/0825 277/595 |
| 5,277,433 A * | 1/1994 | Ishikawa | ............... | F16J 15/0825 277/593 |
| 5,306,023 A * | 4/1994 | Udagawa | ............... | F16J 15/0825 277/601 |
| 5,449,181 A * | 9/1995 | Miyaoh | ............... | F16J 15/0825 277/595 |
| 5,460,387 A * | 10/1995 | Miyaoh | ............... | F02F 11/002 277/601 |
| 5,505,466 A * | 4/1996 | Willis | ............... | F02F 11/002 277/593 |
| 5,511,796 A * | 4/1996 | Udagawa | ............... | F16J 15/0825 277/593 |
| 5,549,307 A * | 8/1996 | Capretta | ............... | F16J 15/0825 277/595 |
| 5,601,294 A * | 2/1997 | Stritzke | ............... | F16J 15/123 277/597 |
| 5,775,701 A * | 7/1998 | Martini | ............... | F16J 15/0887 277/591 |
| 6,139,024 A * | 10/2000 | Yakushiji | ............... | F16J 15/0825 277/592 |
| 6,315,303 B1 * | 11/2001 | Erb | ............... | F16J 15/0825 277/593 |
| 9,464,718 B2 * | 10/2016 | Lee | ............... | F16J 15/0806 |
| 9,643,733 B2 * | 5/2017 | Livingston | ............... | B21D 5/00 |
| 2002/0063395 A1 * | 5/2002 | Klinner | ............... | F16J 15/123 277/592 |
| 2003/0178788 A1 * | 9/2003 | Larson | ............... | F16J 15/123 277/590 |
| 2004/0041352 A1 * | 3/2004 | Hohe | ............... | F16J 15/0818 277/593 |
| 2005/0116427 A1 * | 6/2005 | Seidel | ............... | F16J 15/0818 277/610 |
| 2005/0121859 A1 * | 6/2005 | Seidel | ............... | F16J 15/0881 277/628 |
| 2010/0225070 A1 * | 9/2010 | Kinoshita | ............... | F16J 15/0825 277/592 |
| 2011/0156352 A1 * | 6/2011 | Bond | ............... | F16L 23/18 277/312 |
| 2013/0249171 A1 * | 9/2013 | Kolb | ............... | F16L 23/18 277/608 |
| 2014/0333035 A1 * | 11/2014 | Schemmann | ............... | F16J 15/02 277/602 |
| 2017/0074437 A1 * | 3/2017 | Briggs | ............... | F16L 23/003 |
| 2018/0058616 A1 * | 3/2018 | Rowley | ............... | F16L 23/18 |

FOREIGN PATENT DOCUMENTS

| | | |
|---|---|---|
| JP | 3028418 B2 | 4/2000 |
| JP | 3913165 B2 | 5/2007 |
| KR | 20-0196868 Y1 | 9/2000 |
| KR | 10-2011-0130880 A | 12/2011 |
| KR | 10-2015-0011394 A | 1/2015 |
| KR | 10-1554322 B1 | 9/2015 |

* cited by examiner

GASKET

TECHNICAL FIELD

The present invention relates to a gasket, and more particularly, to a gasket including a C-ring end at at least one side of a kammprofile.

BACKGROUND ART

A gasket collectively refers to static seals coupled between fixed joined surfaces, such as joined surfaces of pressure vessels, pipe flanges, machines and equipment, via a bolt or the like to prevent leakage. Various shapes and materials of gaskets are used according to use conditions such as the type of a working fluid, pressure, temperature, etc.

Originally, gaskets formed of paper, leather, or the like were used for simple purposes but recently, various shapes and materials of gaskets have been used as use conditions become complicated and severe.

That is, a gasket is inserted between two tubular bodies to prevent a fluid from leaking through a gap between the tubular bodies. For example, the gasket is installed between flanges which are connection parts of a valve or tubular bodies, such as pipes, for transferring a fluid to prevent leakage of the fluid, and performs a sealing function to prevent a foreign substance from flowing into the tubular bodies. That is, when the flanges of the valve or the pipes are coupled to each other, the volume of the gasket is compressed by pressure applied in an axial direction and thus a joint between the flanges which are connection parts is sealed from the outside.

A sealing state of such a gasket actually installed and used in a plant should be maintained according to various environments and conditions.

For example, the sizes and positions of flanges between which a gasket is mounted, a bolting process for coupling the gasket to the flanges, etc. should be considered. In particular, when an operating condition of the plant is that heating and cooling should be continuously performed and thus a high-temperature and high-pressure fluid repeatedly flows inside tubular bodies 1, the flatness of flanges 2 which are connection parts of the tubular bodies 1 are difficult to perfectly horizontally maintain. Thus, the distance between the flanges 2 deflectively increases as illustrated in FIG. 1 (D2>D1).

That is, the gasket mounted between the flanges should be capable of overcoming such flatness variation and maintaining the sealing state. To this end, a yield point should be high in a sealing direction of the gasket and a restoring force should be high.

PRIOR ART DOCUMENT

[Patent Document]
Korean Registered Patent No. 10-1656598 (registration date: Sep. 5, 2016)

DISCLOSURE

Technical Problem

To solve the above-described problem, the present invention is directed to a gasket having a simple structure and a high restoring force, in which a C-ring end is formed at a side of a kammprofile having sawteeth on upper and lower surfaces thereof.

The present invention is also directed to a gasket including an eyelet covering a C-ring end to decrease turbulence caused by a fluid flowing through a pipe.

The present invention is also directed to a gasket including an outer ring provided on another side of a kammprofile to be more exactly mounted between flanges.

The present invention is also directed to a gasket including a stopper on at least a part of a sawtooth member of a kammprofile and thus being capable of maintaining an optimum sealing state.

Technical Solution

One aspect of the present invention provides a gasket interposed between flanges which are connection parts between pipes, the gasket including a kammprofile, a C-ring end formed at an inner side of the kammprofile, and an outer-ring end formed at an outer side of the kammprofile.

Sawteeth may be formed on an upper surface and a lower surface of the kammprofile.

The gasket may further include a core spring configured to be accommodated in the C-ring end via an opening of the C-ring end. The opening of the C-ring end may be welded.

A stopper may be formed on at least a part of the upper and lower surfaces of the kammprofile.

The gasket may further include a core spring configured to be accommodated in the C-ring end via an opening of the C-ring end, The gasket may further include an eyelet configured to cover the C-ring end. The opening of the C-ring end may be welded.

The kammprofile may have a center part more bulging than opposite ends thereof in a vertical direction.

The gasket may further include a core spring configured to be accommodated in the C-ring end via an opening of the C-ring end.

The gasket may further include an eyelet configured to cover the C-ring end.

The opening of the C-ring end may be welded.

Another aspect of the present invention provides a gasket interposed between flanges which are connection parts between pipes, the gasket including a kammprofile having a center part more bulging than opposite ends thereof in a vertical direction, and a C-ring end formed at an inner side of the kammprofile.

The gasket may further include a core spring configured to be accommodated in the C-ring end via an opening of the C-ring end.

The gasket may further include an eyelet configured to cover the C-ring end.

Another aspect of the present invention provides a gasket interposed between flanges which are connection parts between pipes, the gasket including a kammprofile, a first C-ring end formed at an inner side of the kammprofile, and a second C-ring end formed at an outer side of the kammprofile, wherein sawteeth are formed on upper and lower surfaces of the kammprofile.

The gasket may further include a first core spring configured to be accommodated in the first C-ring end; and a second core spring configured to be accommodated in the second C-ring end. An opening of the first C-ring end and an opening of the second C-ring end may be welded.

The gasket may further include a first core spring configured to be accommodated in the first C-ring end, and a second core spring configured to be accommodated in the second C-ring end. The kammprofile may have a center part more bulging then opposite ends thereof in a vertical direction.

The gasket may further include a first eyelet configured to cover the first C-ring end, and a second eyelet configured to cover the second C-ring end.

The gasket may further include an outer ring configured to be mounted at an outer side of an opening of the second C-ring end.

The gasket may further include a first core spring configured to be accommodated in the first C-ring end, and a second core spring configured to be accommodated in the second C-ring end. A stopper may be formed on at least a part of the upper and lower surfaces of the kammprofile.

The gasket may further include a first eyelet configured to cover the first C-ring end, and a second eyelet configured to cover the second C-ring end.

The gasket may further include an outer ring configured to be mounted at an outer side of an opening of the second C-ring end.

Another aspect of the present invention provides a gasket interposed between flanges which are connection parts between pipes, the gasket including a metal member having upper and lower surfaces which are flat in a horizontal direction, and a C-ring end formed at an inner side of the metal member.

The gasket may further include a coil spring configured to be accommodated in the C-ring end. An opening of the C-ring end may be welded.

Another aspect of the present invention provides a gasket interposed between flanges which are connection parts between pipes, the gasket including a metal member having upper and lower surfaces which are flat in a horizontal direction, a first C-ring end formed at an inner side of a kammprofile, and a second C-ring end formed at an outer side of the kammprofile.

The gasket may further include a first core spring configured to be accommodated in the first C-ring end, and a second core spring configured to be accommodated in the second C-ring end. An opening of the first C-ring end and an opening of the second C-ring end may be welded.

Advantageous Effects

A gasket according to an exemplary embodiment of the present invention has the following advantages.

First, the gasket may secure a higher bolting force and restoring force than those of other gaskets having the same size as the gasket. Thus, the sealing performance of the gasket is improved even at a high temperature and under a high pressure.

Second, a core spring may be easily fixed and attached through a C-ring end formed at a side of a kammprofile without an external jacket. Thus, production costs may be reduced by simplifying the structure of the gasket as described above. Furthermore, the restoring force of the gasket may be improved.

Thirdly, a load of a fastening bolt may be concentrated around peaks of a sawtooth member even under a low bolting pressure through the saw tooth member formed on upper and lower surfaces of the kammprofile. Thus, perfect sealing performance may be provided.

Fourthly, the C-ring end is formed at opposite sides of the kammprofile and thus the restoring force and sealing performance of the gasket are more improved.

Fifthly, the gasket includes an eyelet covering the C-ring end of the kammprofile and thus inner components of the gasket may be prevented from coming into direct contact with a fluid flowing through a pipe, thereby decreasing turbulence caused by the fluid.

Sixthly, a plate coil spring is used as a core spring to secure a restoring force and evenly disperse pressure, thereby increasing the lifespan of the gasket.

Seventhly, since the gasket includes the kammprofile having a center portion more bulging than the opposite ends thereof in a vertical direction, a sealing layer covering the gasket may be more firmly inserted between sawteeth of the sawtooth member of the kammprofile on the center portion of the kammprofile to which a highest gasket installation surface pressure is applied, thereby increasing a sealing effect.

Eighthly, a stopper is provided on at least a part of the sawtooth member of the kammprofile to prevent the sealing layer and the sawtooth member of the gasket from being excessively compressed, thereby maintaining an optimum sealing state.

MODES OF THE INVENTION

Hereinafter, the principles of the invention will be simply illustrated. Although not clearly described or illustrated herein, those of ordinary skill in the art may implement the principles of the invention and invent various devices falling within the idea and scope of the invention. It should be understood that all the conditional terminology and embodiments set forth herein are intended to only help understand the idea of the invention and the present invention is not limited to the embodiments and states described herein.

The above-described purposes, features, and advantages will be apparent from the following description in conjunction with the appended drawings. Thus, those of ordinary skill in the art may easily implement the technical idea of the invention.

In the following description, well-known technologies related to the present invention are not described in detail if it is determined that they would obscure the invention due to unnecessary detail.

Generally, gaskets according to embodiments of the present invention may have a ring shape according to a shape of a flange but are not limited thereto and may have various shapes, e.g., an oval shape, an oblong square shape, a diamond shape, if necessary.

First, a kammprofile 10 employed in various embodiments of the present invention may be formed of a high-temperature metal material, e.g., stainless steel or Inconel, to maintain a high compressive force and restoring force even in extreme situations, e.g., high pressure, high temperature, etc. In more detail, the kammprofile 10 may be formed of stainless steel 347, Inconel 825, or the like.

The drawings which will be described below illustrate cut planes of gaskets to effectively explain inner components of the gaskets.

FIGS. 2 to 5 are diagrams illustrating gaskets according to various embodiments of the present invention and modified examples thereof.

FIGS. 2A to 2F are diagrams illustrating a gasket according to a first embodiment of the present invention and modified examples thereof.

Figure 1:
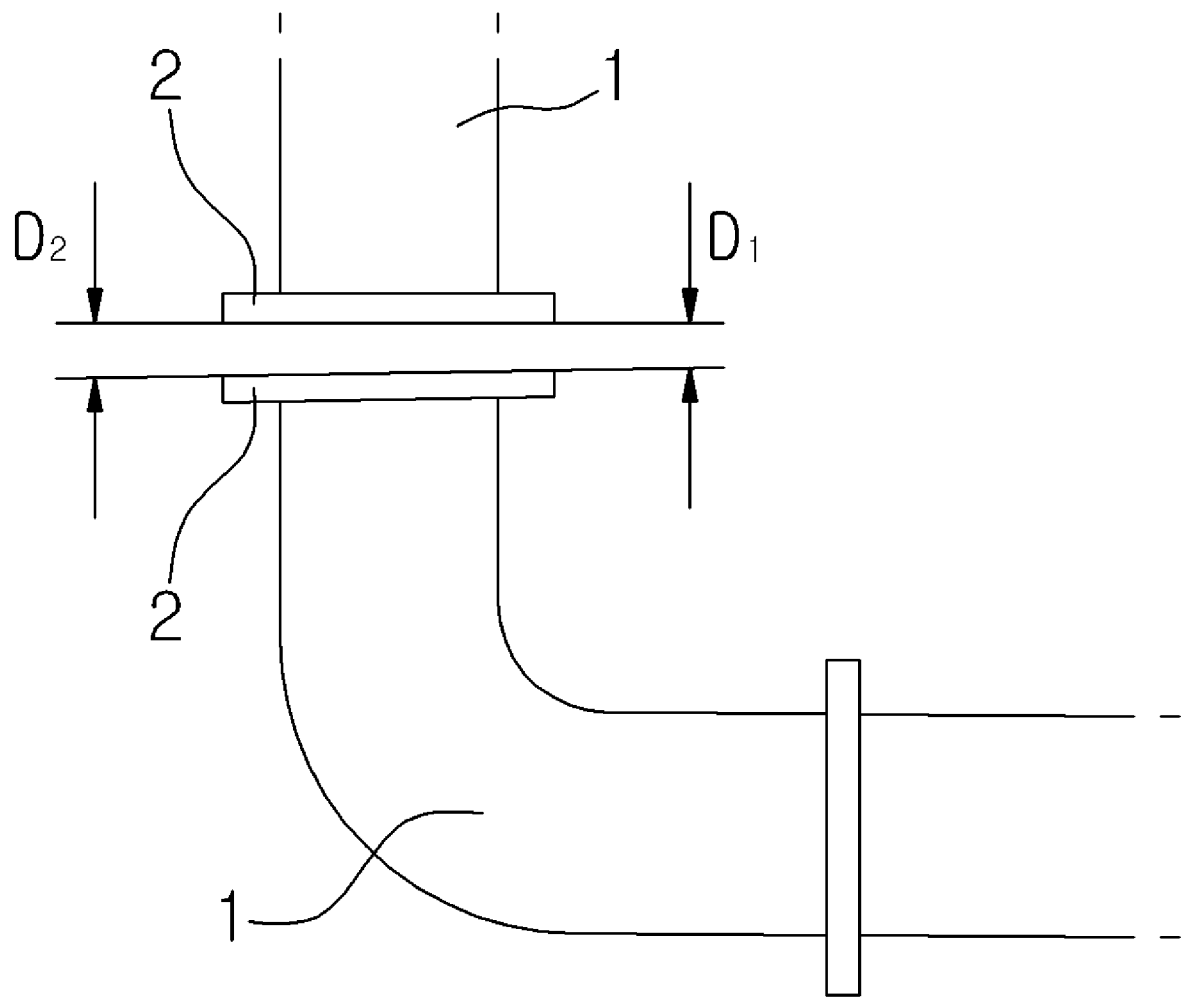
FIG. 1 illustrates a state in which the distance between flanges to which a gasket is applied deflectively increases.
Figure 2A:
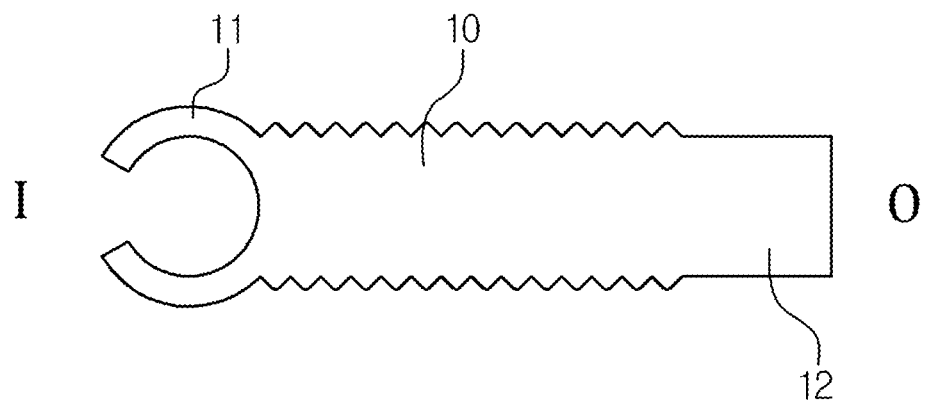
FIGS. 2A to 2H are diagrams illustrating a gasket according to a first embodiment of the present invention and modified examples thereof.

As illustrated in FIG. 2A, the gasket according to the first embodiment of the present invention may include a kammprofile 10, a C-ring end 11 formed at an inner side (I) of the kammprofile 10, and an outer ring end 12 formed at an outer side (O) of the kammprofile 10.

A sawtooth member may be formed on upper and lower surfaces of the kammprofile 10. The sawtooth member may be manufactured by serration processing. The gasket according to the first embodiment of the present invention may concentrate a load of a fastening bolt around peaks of the sawtooth member under low bolting pressure through the sawtooth members on the upper and lower surfaces of the kammprofile 10, thereby maintaining perfect sealing performance even under the low bolting pressure.

The outer-ring end 12 formed at the outer side (O) of the kammprofile 10 may guide the gasket to be mounted at an exact location on a flange when the gasket is mounted between the flange.

More specifically, when the gasket is mounted between the flanges, the gasket is compressed between the flanges. In this case, the outer-ring end 12 comes into contact with an inner side of a flange fastening bolt (not shown). Thus, the outer-ring end 12 may prevent the gasket from being deformed in a horizontal direction and guide the gasket to be mounted at a more exact location on the flange.

The outer-ring end 12 is integrally formed with the kammprofile 10.

Figure 2B:
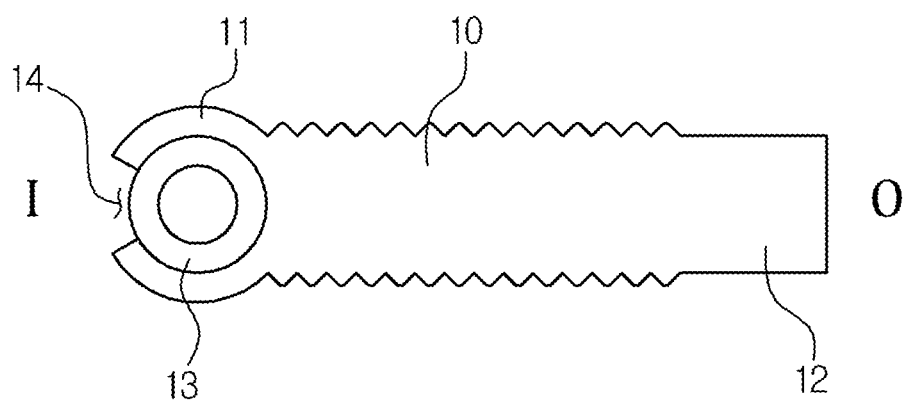

A modification may be made to the gasket according to the first embodiment of the present invention as illustrated in FIG. 2B. The gasket illustrated in FIG. 2B may further include a core spring 13 accommodated in the gasket via an opening 14 of the C-ring end 11.

In the gasket, the C-ring end 11 is formed at the inner side (I) of the kammprofile 10 and thus the core spring 13 may be easily fixed and attached to a side of the kammprofile 10 without an external jacket. Furthermore, the core spring 13 may provide a high yielding property to the gasket and thus the restoring force of the gasket may be improved.

That is, the restoring force and sealing performance of the gasket including the C-ring end 11 having a self-energizing function and the core spring 13 assisting the self-energizing function of the C-ring end 11 may be better than those of a conventional gasket including only a kammprofile.

Figure 2C:
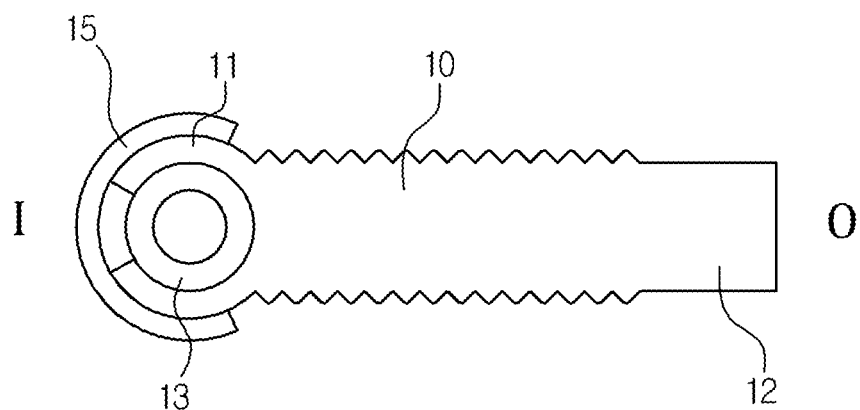

A modification may be made to the gasket according to the first embodiment of the present invention as illustrated in FIG. 2C. The gasket illustrated in FIG. 2C may further include an eyelet 15 covering a C-ring end 11.

The core spring 13 is accommodated in the C-ring end 11, and may be exposed to the outside via the opening 14 of the C-ring end 11. As described above, the eyelet 15 covers the C-ring end 11 such that the opening 14 of the C-ring end 11 is blocked to prevent at least a part of the C-ring end 11 from being exposed to the outside, as well as the core spring 13.

Alternatively, the eyelet 15 may be formed to cover a whole outer side surface of the C-ring end 11 formed at the kammprofile 10 such that the C-ring end 11 is perfectly protected from the outside, as well as the core spring 13.

That is, owing to the above structure of the gasket, a fluid flowing through a pipe may be prevented from coming into direct contact with the inner components of the gasket, thereby decreasing turbulence caused by the fluid.

Figure 2D:
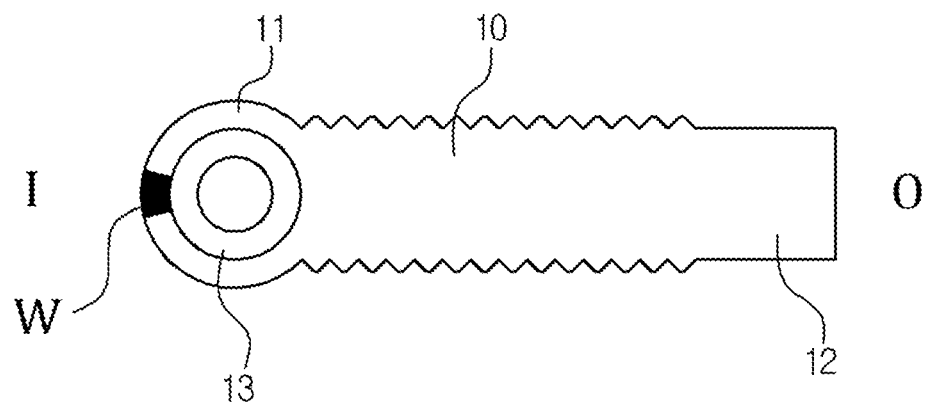
Figure 2E:
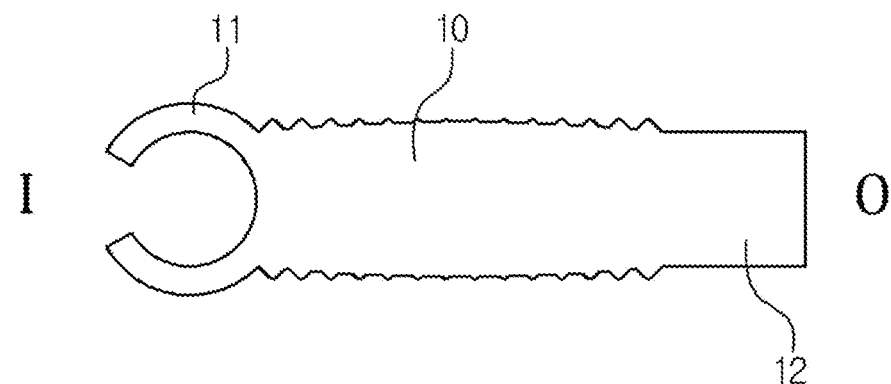
Figure 2F:
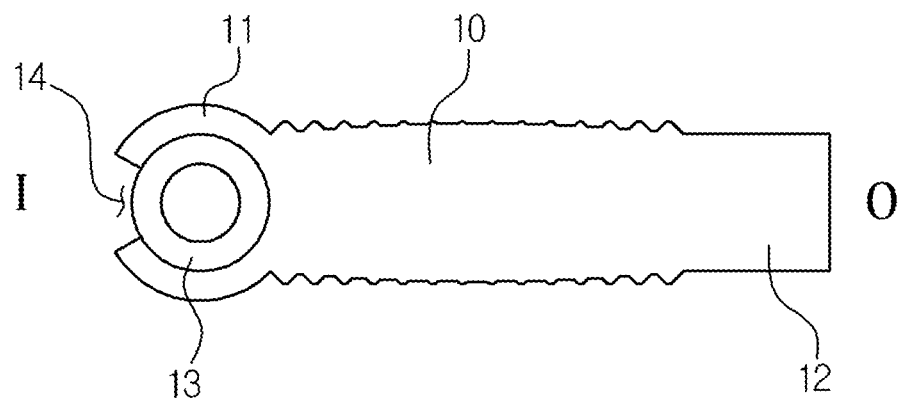
Figure 2G:
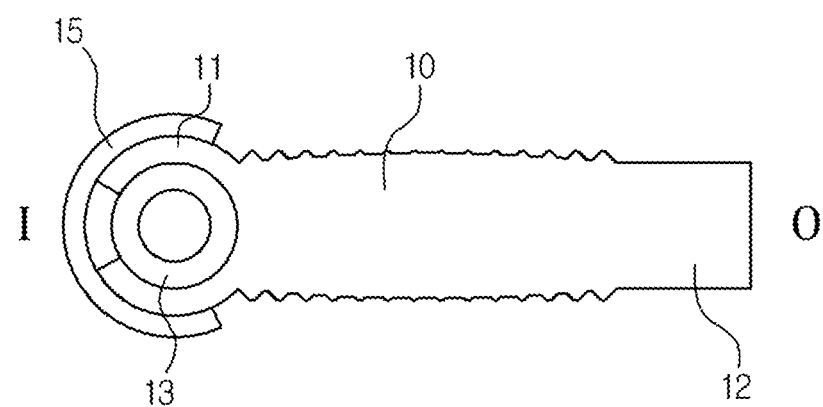
Figure 2H:
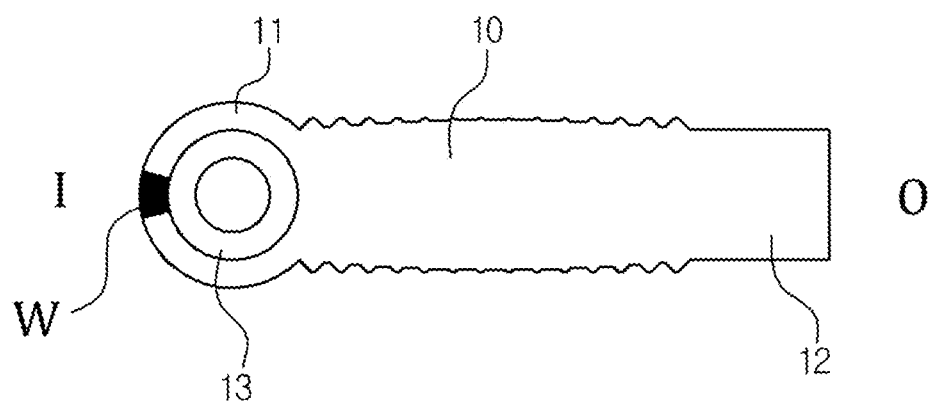

A modification may be made to the gasket according to the first embodiment of the present invention as illustrated in FIG. 2D. In the gasket illustrated in FIG. 2D, an opening 14 of a C-ring end 11 may be welded (W) to seal the inside of the C-ring end 11.

As described above, the core spring 13 may be accommodated in the C-ring end 11, and exposed to the outside via the opening 14 of the C-ring end 11. Thus, the opening 14 of the C-ring end 11 may be welded (W) to protect the core spring 13 from a gas or a fluid which may corrode a metal.

As illustrated in FIGS. 2E to 2H, modifications may be made to the gasket according to the first embodiment of the present invention, in which a convex type kammprofile 10 is provided.

The convex type kammprofile 10 may be understood to mean that a center part of the kammprofile 10 bulges more than inner and outer opposite ends thereof in a vertical direction.

However, the heights of peaks of sawtooth members on the opposite ends and the center part of the kammprofile 10 are the same but the sizes of sawteeth of the sawtooth members decrease from the opposite ends of the kammprofile 10 to the center part thereof.

Owing to the above-described structure of the gasket, a sealing layer (not shown) surrounding the gasket may be more firmly inserted between the sawteeth of the sawtooth members on the center part of the kammprofile 10 to which a highest gasket installation surface pressure is applied. Thus, the gasket according to the first embodiment of the present invention may achieve a higher sealing effect than that of a conventional gasket.

FIGS. 3A to 3D are diagrams illustrating a gasket according to a second embodiment of the present invention and modified examples thereof.

Figure 3A:
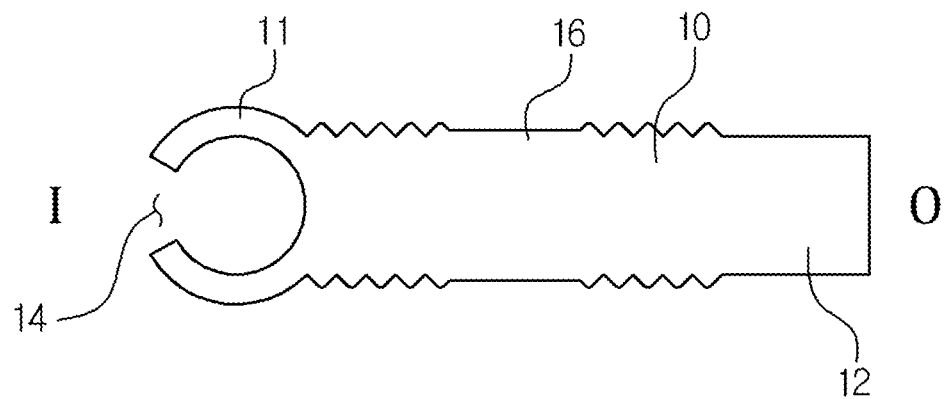
FIGS. 3A to 3D are diagrams illustrating a gasket according to a second embodiment of the present invention and modified examples thereof.

As illustrated in FIG. 3A, the gasket according to the second embodiment of the present invention may include a kammprofile 10, a C-ring end 11 formed at an inner side (I) of the kammprofile 10, and an outer-ring end 12 formed on an outer side (O) of the kammprofile 10.

A sawtooth member may be formed on upper and lower surfaces of the kammprofile 10.

A stopper 16 may be formed on at least a part of the upper and lower surfaces of the kammprofile 10.

Figure 3B:
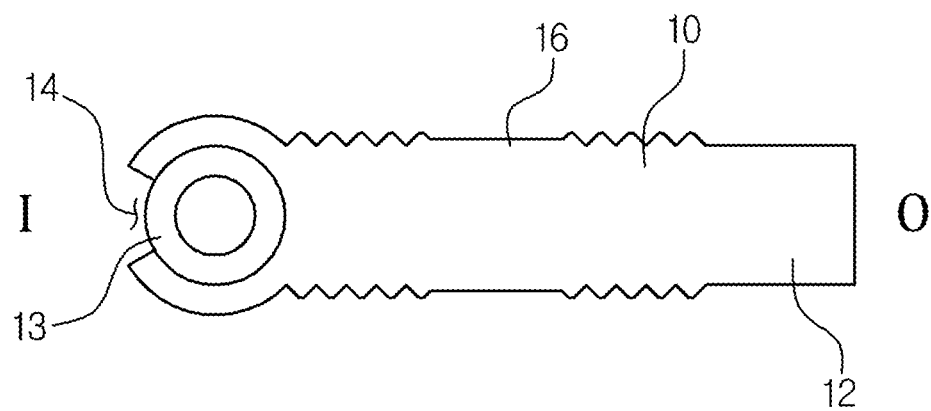

A modification may be made to the gasket according to the second embodiment of the present invention as illustrated in FIG. 3B.

The gasket illustrated in FIG. 3B may further include a core spring 13 accommodated in a C-ring end 11 via an opening 14 of the C-ring end 11.

Figure 3C:
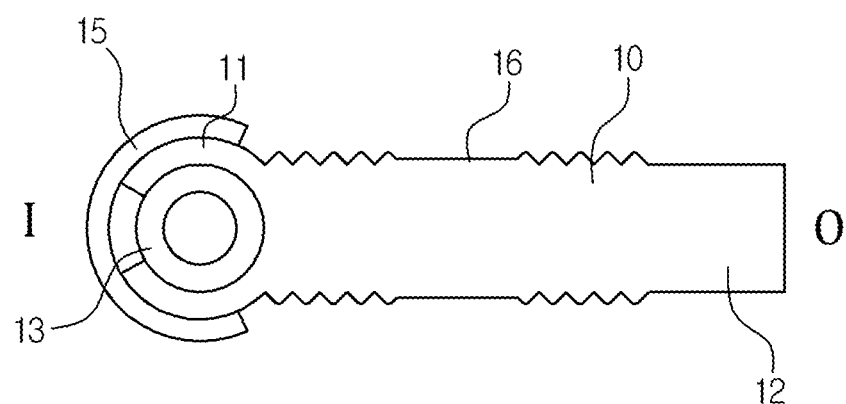

A modification may be also made to the gasket according to the second embodiment of the present invention as illustrated in FIG. 3C. The gasket of FIG. 3C may further include an eyelet 15 covering a C-ring end 11.

Figure 3D:
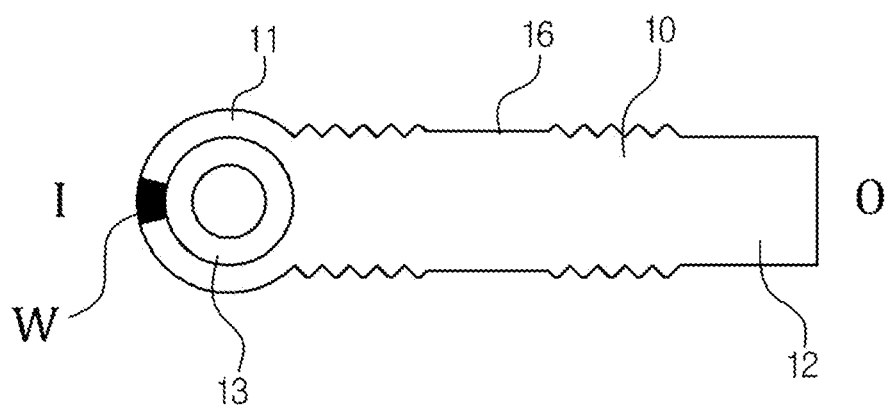

A modification may be made to the gasket according to the second embodiment of the present invention as illustrated in FIG. 3D. In the gasket illustrated in FIG. 3D, an opening 14 of a C-ring end 11 may be welded (W) to seal the inside of the C-ring end 11.

As illustrated in FIGS. 3A to 3D, at least one stopper 16 may be formed on at least a part of the upper surface of the kammprofile 10 instead of a sawtooth member. Similarly, at least one stopper 16 may be formed on at least a part of the lower surface of the kammprofile 10 instead of a sawtooth member.

The stopper 16 may be understood to mean a flat plane structure on at least a part of the upper and lower surfaces of the kammprofile 10.

For example, the stopper 16 may be a flat plane extending horizontally from a point on the kammprofile 10 which is lower than the peaks of the sawtooth member of the kammprofile 10 and higher than valleys of the sawtooth member.

Figure 6A:
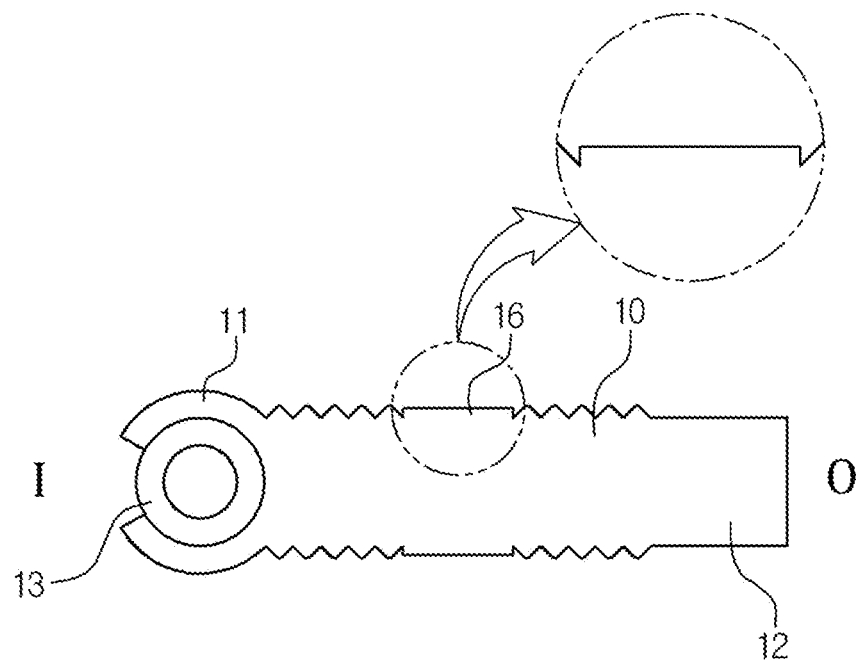
FIGS. 6A and 6B are diagrams illustrating various shapes of a stopper formed on the gasket according to the second embodiment of the present invention.
Figure 6B:
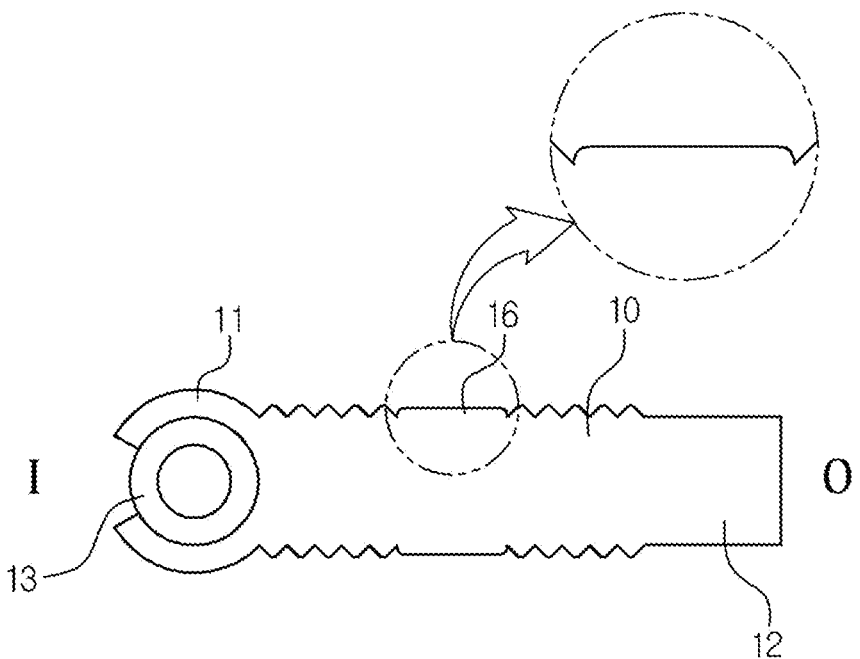

As another example, the stopper 16 may be formed between the peaks of the sawtooth member as illustrated in FIGS. 6A and 6B.

As described above, the gasket according to the second embodiment of the present invention and the modified examples thereof may include the stopper 16 to prevent a sealing layer (not shown) surrounding the gasket and the peaks of the sawtooth member from being excessively compressed by pressure applied to the gasket. Thus, the gasket may maintain an optimum sealing state.

Figure 4A:
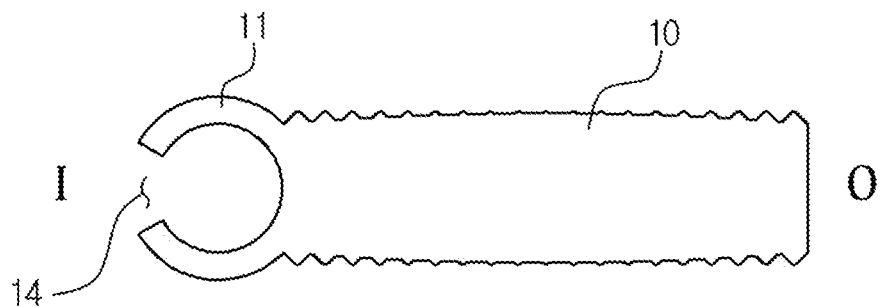
FIGS. 4A to 4C are diagrams illustrating a gasket according to a third embodiment of the present invention and modified examples thereof.
Figure 4B:
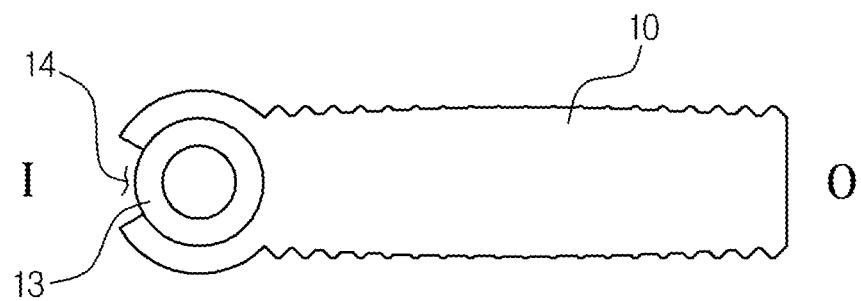
Figure 4C:
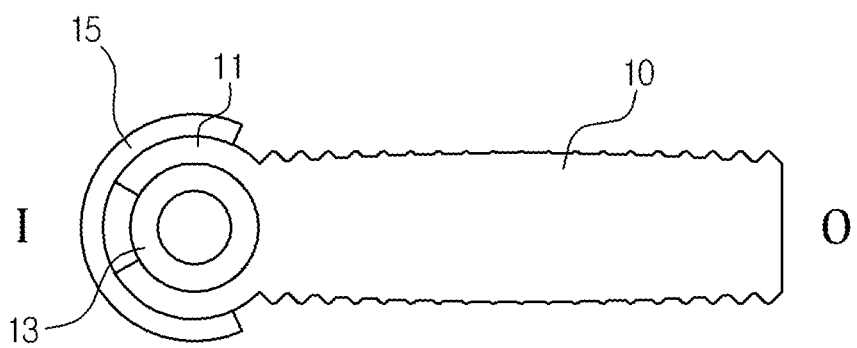

FIGS. 4A to 4C are diagrams illustrating a gasket according to a third embodiment of the present invention and modified examples thereof.

As illustrated in FIG. 4A, the gasket according to the third embodiment of the present invention may include a convex type kammprofile 10 and a C-ring end 11 formed at an inner side (I) of the kammprofile 10.

Similar to the previous embodiments, sawteeth may be formed on upper and lower surfaces of the kammprofile 10 of the gasket according to the third embodiment.

A modification may be made to the gasket according to the third embodiment of the present invention as illustrated in FIG. 4B.

The gasket of FIG. 4B may further include a core spring 13 accommodated in a C-ring end 11 via an opening 14.

A modification may be also made to the gasket according to the third embodiment of the present invention as illustrated in FIG. 4C. The gasket of FIG. 4C may further include an eyelet 15 covering a C-ring end 11.

FIGS. 5A to 5I are diagrams illustrating a gasket according to a fourth embodiment of the present invention and modified examples thereof.

Figure 5A:
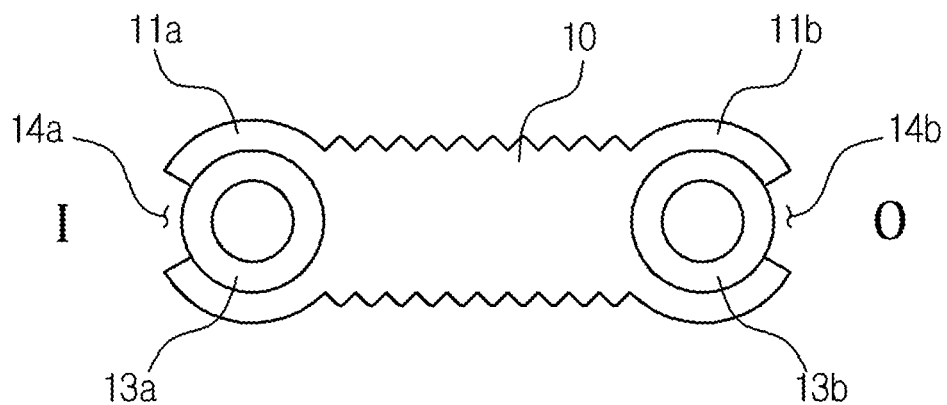
FIGS. 5A to 5K are diagrams illustrating a gasket according to a fourth embodiment of the present invention and modified examples thereof.

As illustrated in FIG. 5A, the gasket according to the fourth embodiment of the present invention may include a kammprofile 10, a first C-ring end 11a formed at an inner side (I) of the kammprofile 10, a first core spring 13a accommodated in the first C-ring end 11a, a second C-ring end 11b formed at an outer side (O) of the kammprofile 10, and a second core spring 13b accommodated in the second C-ring end 11b.

The gasket according to the fourth embodiment includes the two C-ring ends 11a and 11b at opposite sides of the kammprofile 10 and thus the restoring force and sealing performance of the gasket are better than when only one C-ring end is formed at the inner side (I) of the kammprofile 10.

Figure 5B:
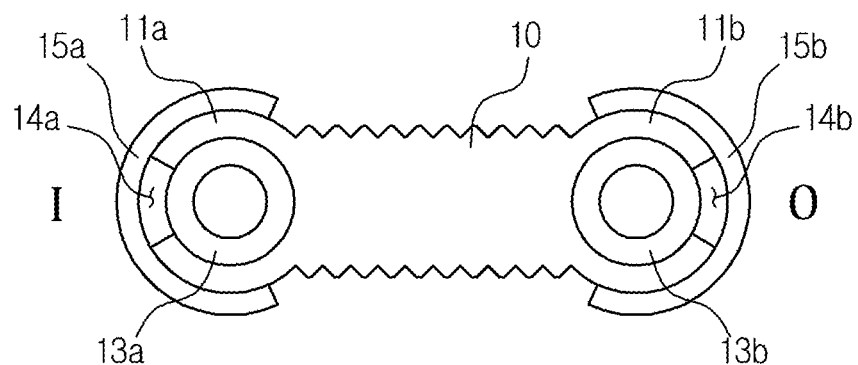

A modification may be made to the gasket according to the fourth embodiment of the present invention as illustrated in FIG. 5B.

The gasket of FIG. 5B may further include a first eyelet 15a covering a first C-ring end 11a, and a second eyelet 15b covering a second C-ring end 11b.

First and second core springs 13a and 13b are respectively accommodated in the first and second C-ring ends 11a and 11b, and are respectively exposed to the outside via an opening 14a of the first C-ring end 11a and an opening 14b of the second C-ring end par 11b. As described above, in order to prevent at least a part of the core springs 13a and 13b and the C-ring ends 11a and 11b from being exposed to the outside, the first eyelet 15a covers the first C-ring end 11a to block the opening 14a of the first C-ring end 11a and the second eyelet 15b covers the second C-ring end 11b to block the opening 14b of the second C-ring end 11b.

With the eyelets 15a and 15b, a fluid flowing through a pipe may be more effectively prevented from coming into direct contact with inner components of the gasket, thereby greatly decreasing turbulence caused by the fluid.

Figure 5C:
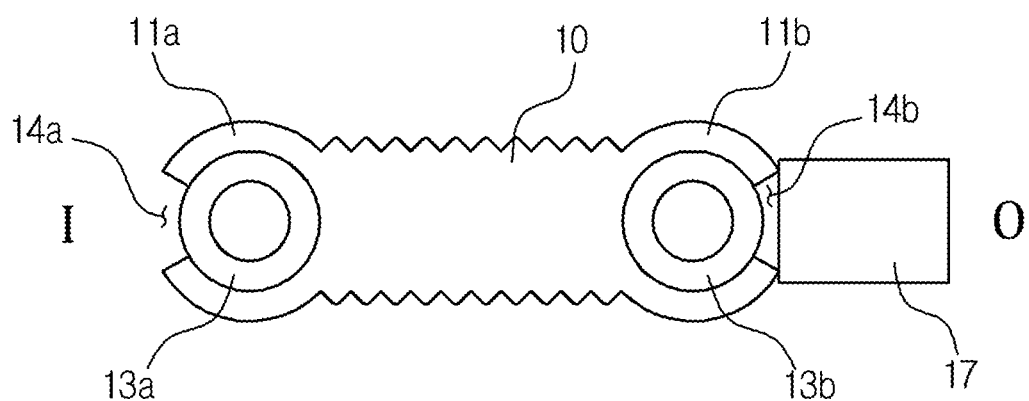

A modification may be made to the gasket according to the fourth embodiment of the present invention as illustrated in FIG. 5C.

The gasket of FIG. 5C may include a kammprofile 10, a first C-ring end 11a formed at an inner side (I) of the kammprofile 10, a first core spring 13a accommodated in the first C-ring end 11a, a second C-ring end 11b formed at an outer side (O) of the kammprofile 10, a second core spring 13b accommodated in the second C-ring end 11b, and an outer ring 17 formed at an outer side (O) of an opening 14b of the second C-ring end 11b.

The outer ring 17 may be formed to be separated from the kammprofile 10 or the second C-ring end 11b, unlike the outer-ring end 12 of FIG. 2A.

Similar to the outer-ring end 12 of FIG. 2A, the outer ring 17 may guide the gasket to be mounted at an exact location on a flange when the gasket is mounted on the flange. Furthermore, the outer ring 17 may seal the opening 14b of the second C-ring end 11b. Thus, the second core spring 13b accommodated in the second C-ring end 11b may be prevented from being exposed to the outside.

Figure 5D:
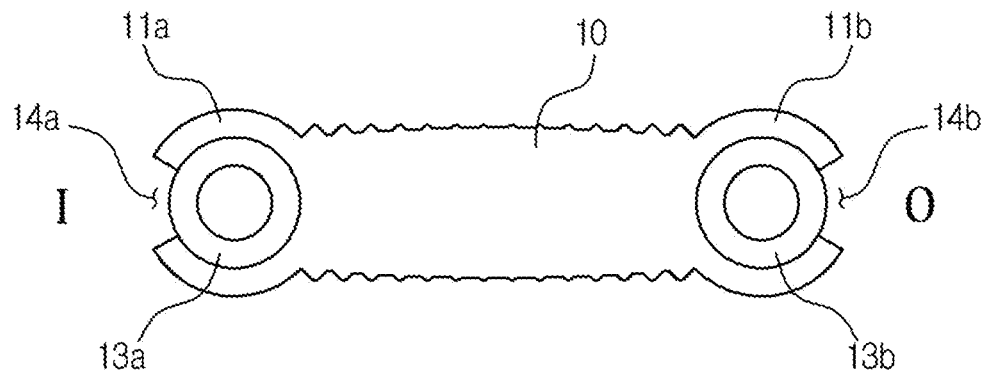
Figure 5E:
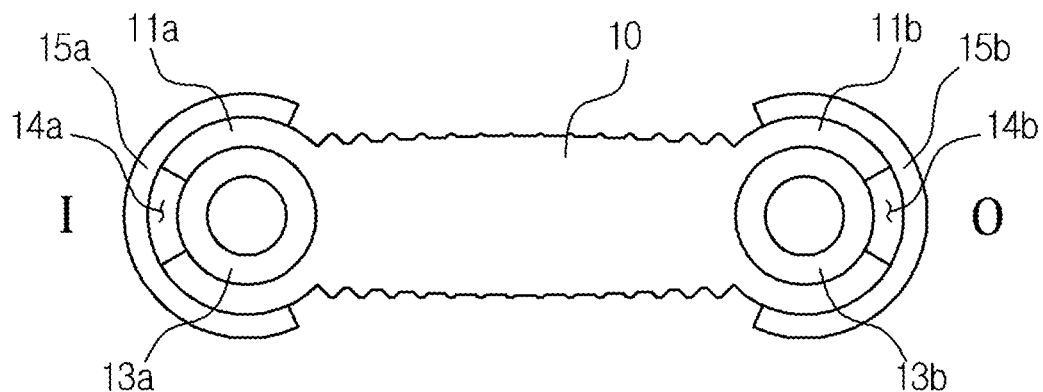
Figure 5F:
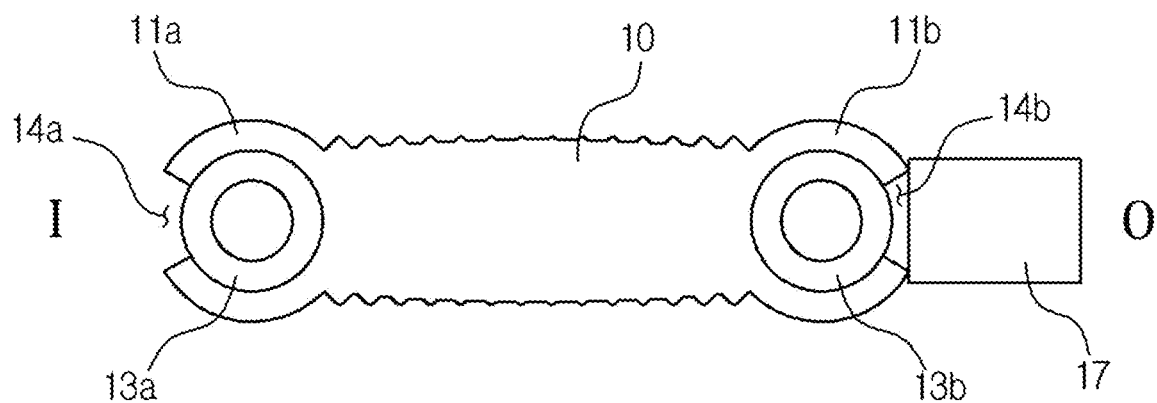
Figure 5G:
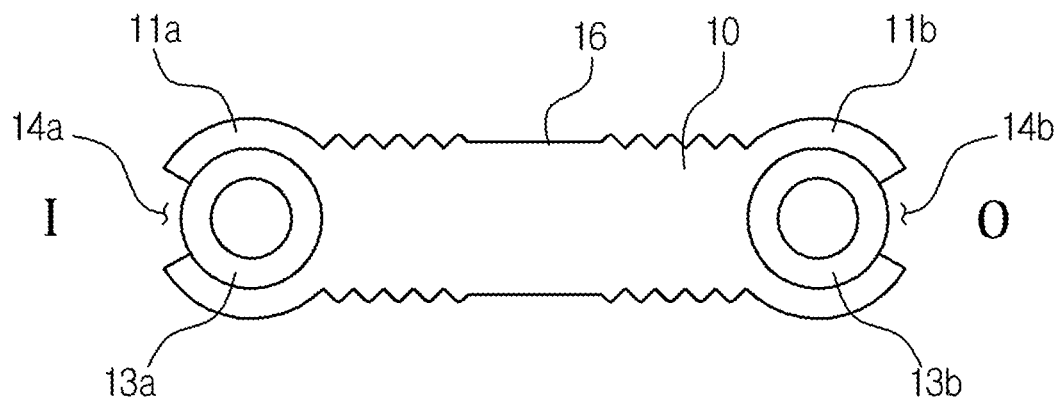
Figure 5H:
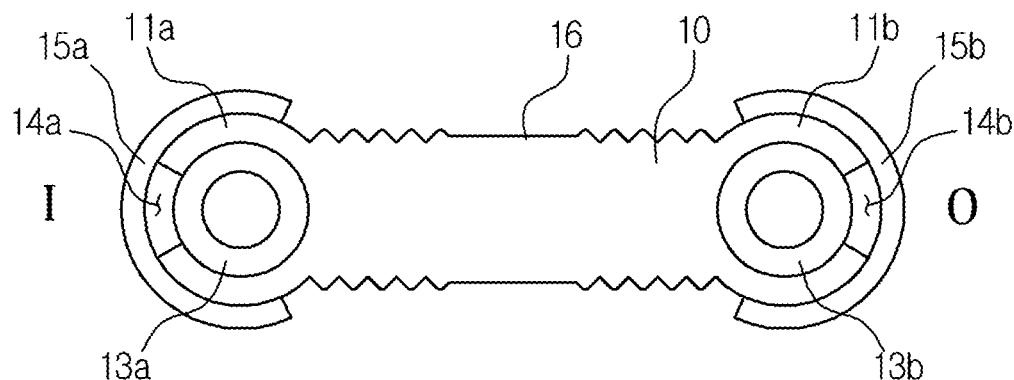
Figure 5I:
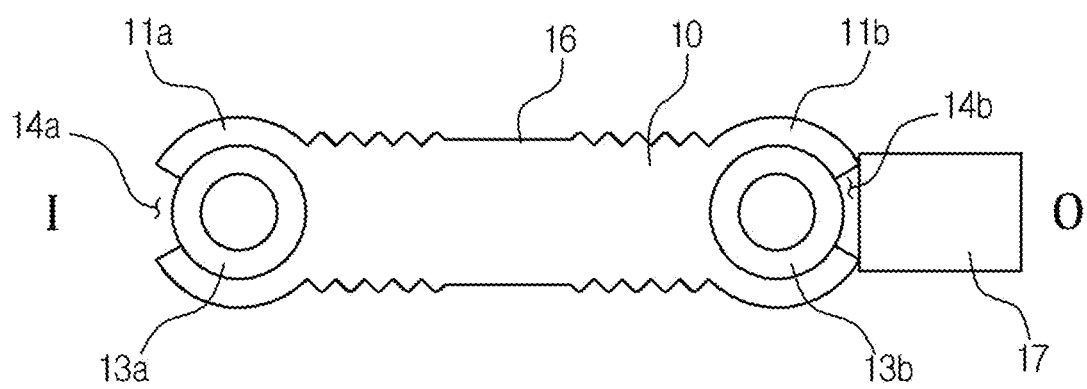
Figure 5J:
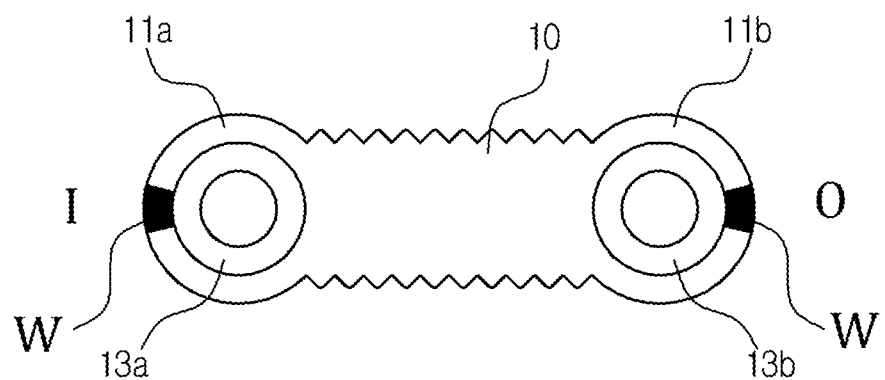
Figure 5K:
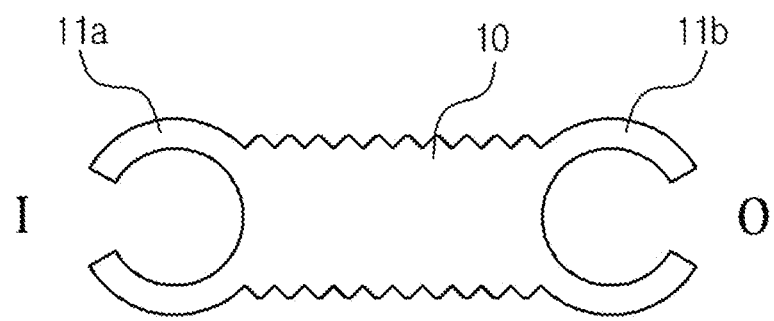

A modification may be made to the gasket according to the fourth embodiment of the present invention as illustrated in FIG. 5J.

The gasket of FIG. 5J may include a kammprofile 10, a first C-ring end 11a formed at an inner side (I) of the kammprofile 10, a first core spring 13a accommodated in the first C-ring end 11a, a second C-ring end 11b formed at an outer side (O) of the kammprofile 10, and a second core spring 13b accommodated in the second C-ring end 11b. An opening 14a of the first C-ring end 11a and an opening 14b of the second C-ring end 11b may be welded (W) to seal the insides of the C-ring ends 11a and 11b.

Modifications may be made to the gasket according to the fourth embodiment of the present invention as illustrated in FIGS. 5D to 5F.

The gasket of FIG. 5D may include a kammprofile 10 having a center part more bulging than opposite ends thereof in a vertical direction, a first C-ring end 11a formed at an inner side (I) of the kammprofile 10, a first core spring 13a accommodated in the first C-ring end 11a, a second C-ring end 11b formed at an outer side (O) of the kammprofile 10, and a second core spring 13b accommodated in the second C-ring end 11b.

The gasket illustrated in FIG. 5E may further include a first eyelet 15a covering a first C-ring end 11a and a second eyelet 15b covering a second C-ring end 11b, when compared to the gasket of FIG. 5D.

The gasket illustrated in FIG. 5F may further include an outer ring 17 formed at an outer side of an opening 14b of the second C-ring end 11b, when compared to the gasket of FIG. 5D.

Furthermore, modifications may be made to the gasket according to the fourth embodiment of the present invention as illustrated in FIGS. 5G to 5I.

The gasket of FIG. 5G may include a kammprofile 10 including a stopper 16 formed on at least a part of upper and lower surfaces thereof, a first C-ring end 11a formed at an inner side (I) of the kammprofile 10, a first coil spring 13a accommodated in the first C-ring end 11a, a second C-ring end 11b formed at an outer side (O) of the kammprofile 10, and a second coil spring 13b accommodated in the second C-ring end 11b.

The gasket of FIG. 5H may further include a first eyelet 15a covering a first C-ring end 11a and a second eyelet 15b covering a second C-ring end 11b, when compared to the gasket of FIG. 5G.

The gasket of FIG. 5I may further include an outer ring 17 formed at an outer side of an opening 14b of a second C-ring end 11b, when compared to the gasket of FIG. 5G.

Figure 7A:
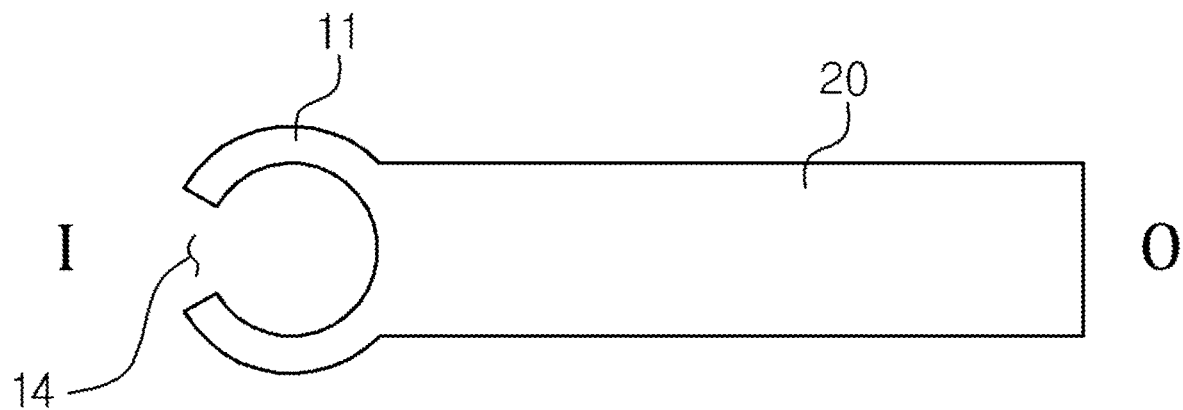
FIGS. 7A to 7C are diagrams illustrating a gasket according to a fifth embodiment of the present invention and modified examples thereof.
Figure 7B:
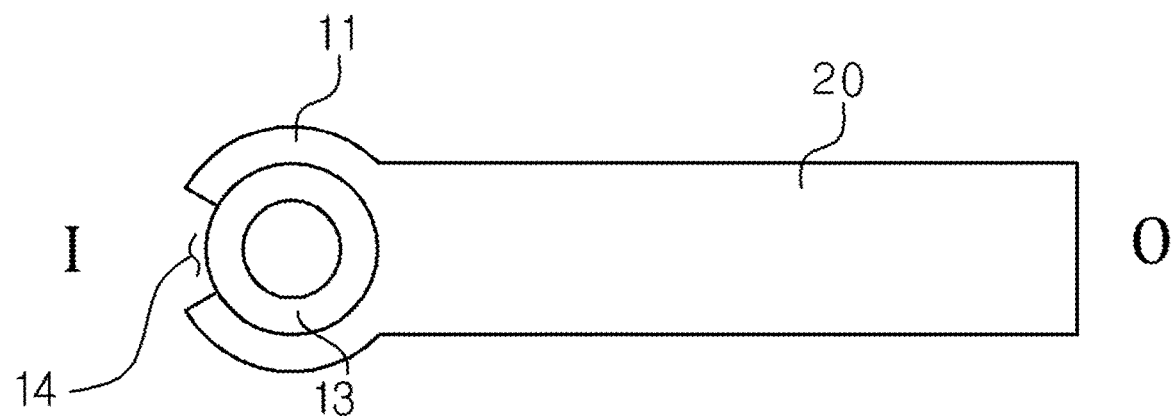
Figure 7C:
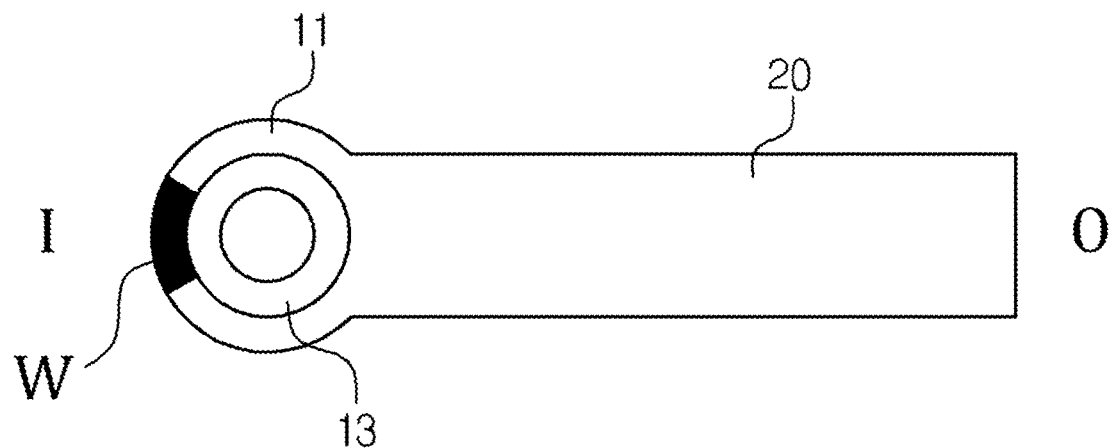

FIGS. 7A to 7C are diagrams illustrating a gasket according to a fifth embodiment of the present invention and modified examples thereof.

As illustrated in FIG. 7A, the gasket according to the fifth embodiment of the present invention may include a metal member 20 having upper and lower surfaces which are flat in a horizontal direction and formed of a metal material, and a C-ring end 11 formed at an inner side (I) of the metal member 20.

In the gasket according to the fifth embodiment, the metal member 20 having the upper and lower surfaces which are flat in the horizontal direction may prevent the C-ring end 11 from being excessively compressed, and serve as the outer-ring end 12 of FIG. 2 which guides the gasket to be mounted at an exact location on a flange when the gasket is mounted on the flange.

Modifications may be made to the gasket according to the fifth embodiment of the present invention as illustrated in FIGS. 7B and 7C.

The gasket of FIG. 7B may further include a coil spring 13 accommodated in a C-ring end 11, when compared to the gasket of FIG. 7A.

An opening 14 of a C-ring end 11 may be welded in the gasket of FIG. 7C, when compared to the gasket of FIG. 7B.

Figure 8A:
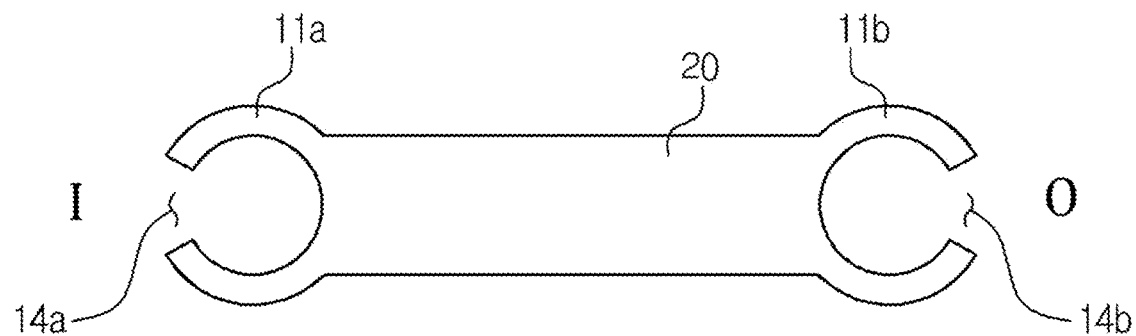
FIGS. 8A to 8C are diagrams illustrating a gasket according to a sixth embodiment of the present invention and modified examples thereof.
Figure 8B:
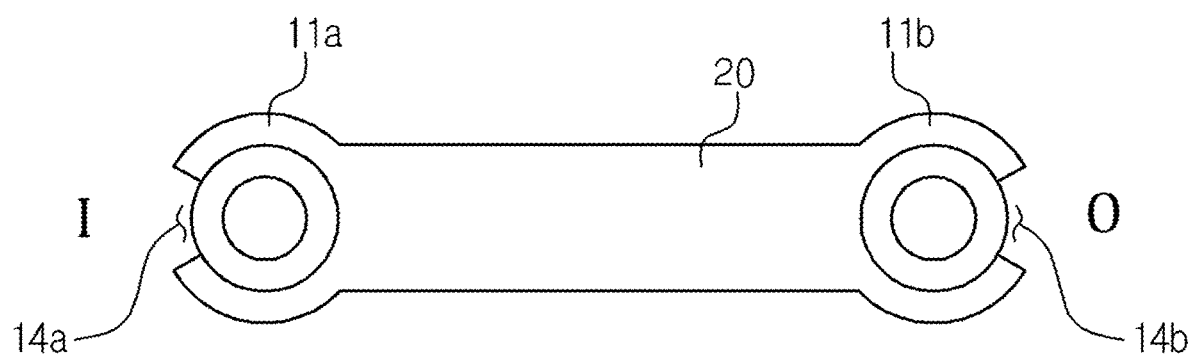
Figure 8C:
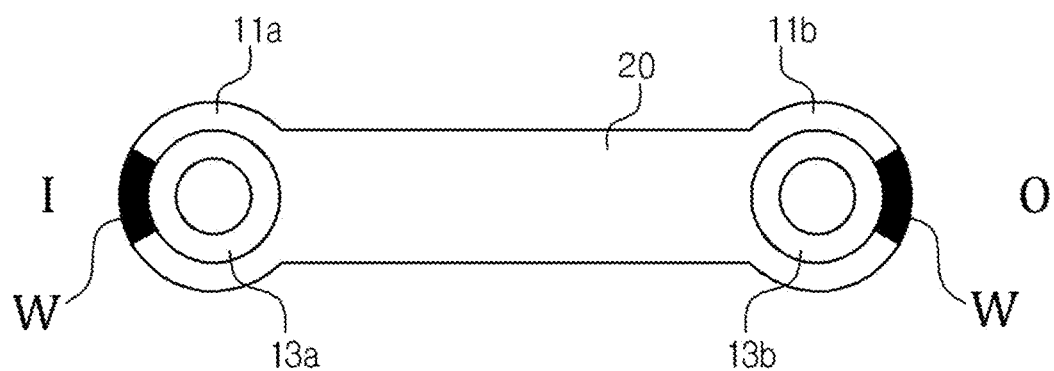

FIGS. 8A to 8C are diagrams illustrating a gasket according to a sixth embodiment of the present invention and modified examples thereof.

As illustrated in FIG. 8A, the gasket according to the sixth embodiment of the present invention may include a metal member 20 having upper and lower surfaces which are flat in a horizontal direction and formed of a metal material, a first C-ring end 11a formed at an inner side (I) of the metal member 20, and a second C-ring end 11b formed at an outer side (O) of the metal member 20.

Modifications may be made to the gasket according to the sixth embodiment of the present invention as illustrated in FIGS. 8B and 8C.

The gasket of FIG. 8B may further include a first core spring 13a accommodated in a first C-ring end 11a and a second core spring 13b accommodated in the second C-ring end 11b, when compared to the gasket of FIG. 8A.

An opening 14a of the first C-ring end 11a and an opening 14b of the second C-ring end 11b may be welded (W) in the gasket of FIG. 8C, when compared to the gasket of FIG. 8B.

In the gaskets according to various embodiments of the present invention and modified examples, the core springs 13, 13a, and 13b may be plate coil springs. The core springs 13, 13a, and 13b may secure restoring forces of the gaskets, and appropriately disperse pressure applied to the gaskets from the outside to prevent a force from being concentrated on specific parts of the gaskets, thereby improving the durability of the gaskets.

As described above, according to various embodiments of the present invention, first, a higher bolting force and restoring force of a gasket may be secured than those of other gaskets having the same size as the gasket. Thus, sealing performance may be improved even at high temperatures and under high pressures.

Second, a core spring may be easily fixed and attached through a C-ring end formed at a side of a kammprofile without an external jacket. Thus, production costs may be reduced by simplifying the structure of the gasket as described above. Furthermore, the restoring force of the gasket may be improved.

Thirdly, a load of a fastening bolt may be concentrated around peaks of sawtooth members through sawtooth members formed on upper and lower sides of the kammprofile. Thus, perfect sealing performance may be provided.

Fourthly, C-ring ends are formed at opposite sides of the kammprofile and thus the restoring force and sealing performance of the gasket may be more improved.

Fifthly, eyelets are provided to cover the C-ring ends on the kammprofile to prevent inner components of the gasket from coming into direct contact with a fluid flowing through a pipe, thereby decreasing turbulence caused by the fluid.

Sixthly, a plate coil spring is used as a core spring and thus pressure may be evenly dispersed while securing restoring force, thereby increasing the lifespan of the gasket.

Seventhly, a kammprofile having a center part more bulging than opposite ends thereof is provided so that a sealing layer covering the gasket may be more firmly inserted between peaks of the sawtooth member on the center part of the kammprofile to which highest gasket installation surface pressure is applied, thereby increasing a sealing effect.

Eighthly, a stopper is provided on at least a part of the sawtooth member on the kammprofile to prevent the sealing layer from being excessively compressed, thereby maintaining an optimum sealing state.

The embodiments set forth herein are merely illustrations of the technical idea of the present invention. Thus, various changes, modifications, and replacements may be made to the present invention without departing from the essential features of the present invention by those of ordinary skill in the technical field to which the present invention pertains.

Therefore, the scope of the technical idea of the present invention is not limited by the embodiments set forth herein and the appended drawings. The scope of the present invention should be defined by the claims, and it should be understood that all technical ideas falling within the same scope as the present invention fall within the scope of the present invention.

REFERENCE NUMERALS

10: kammprofile
11: C-ring end
12: outer ring end

13: core spring
14: opening
15: eyelet
16: stopper
17: outer ring
20: metal member

The invention claimed is:

1. A gasket interposed between flanges which are connection parts between pipes, the gasket comprising:
- a kammprofile having sawteeth on an upper surface and a lower surface thereof;
- a C-ring end having an opening and a self-energizing function and formed at an inner side of the kammprofile to be integrally formed with the kammprofile;
- an outer-ring end formed at an outer side of the kammprofile to be integrally formed with the kammprofile;
- a core spring assisting the self-energized function of the C-ring end and accommodated in the C-ring end, a portion of the core spring being exposed through the opening of the C-ring end;
- a stopper formed on at least a part of the upper surface and the lower surface of the kammprofile,
- wherein the stopper is a flat plane extending horizontally from a point on the kammprofile which is lower than peaks of the sawteeth and higher than valleys of the sawteeth; and
- an eyelet disposed on an outer surface of the C-ring end, covering the C-ring end and blocking the opening of the C-ring end,
- wherein the eyelet covers a whole outer side surface of the C-ring end formed at the kammprofile such that the C-ring end and the core spring are protected from outside of the gasket.

2. A gasket interposed between flanges which are connection parts between pipes, the gasket comprising:
- a kammprofile having sawteeth on an upper surface and a lower surface thereof;
- a first C-ring end having an opening and a self-energizing function and formed at an inner side of the kammprofile to be integrally formed with the kammprofile;
- a first core spring having a circular shape and assisting the self-energizing function of the first C-ring end and accommodated in the first C-ring end;
- a second C-ring end having an opening and a self-energizing function and formed at an outer side of the kammprofile to be integrally formed with the kammprofile;
- a second core spring assisting the self-energizing function of the second C-ring end and accommodated in the second C-ring end;
- a stopper formed on at least a part of the upper surface and the lower surface of the kammprofile,
- wherein the stopper is a flat plane extending horizontally from a point on the kammprofile which is lower than peaks of the sawteeth and higher than valleys of the sawteeth;
- a first eyelet disposed on an outer surface of the first C-ring end, covering the first C-ring end and blocking the opening of the first C-ring end; and
- a second eyelet disposed on an outer surface of the second C-ring end, covering the second C-ring end and blocking the opening of the second C-ring end,
- wherein the first eyelet covers a whole outer side surface of the first C-ring end such that the first C-ring end and the first core spring are protected from outside of the gasket; and
- wherein the second eyelet covers a whole outer side surface of the second C-ring end such that the second C-ring end and the second core spring are protected from outside of the gasket.

3. The gasket of claim 1, wherein the sawteeth are manufactured by serration processing.

4. The gasket of claim 2, wherein the sawteeth are manufactured by serration processing.

5. The gasket of claim 2, further comprising an outer ring mounted at an outer side of an opening of the second C-ring end.

6. The gasket of claim 1, wherein the core spring comprises a coil spring.

7. The gasket of claim 2, wherein the core spring comprises a coil spring.

* * * * *